US009163505B2

(12) United States Patent
Dion et al.

(10) Patent No.: US 9,163,505 B2
(45) Date of Patent: Oct. 20, 2015

(54) PISTON CONSTRUCTIONS FOR OPPOSED-PISTON ENGINES

(75) Inventors: Eric P. Dion, Encinitas, CA (US); Brendan M. Lenski, West Bloomfield, MI (US); Ryan G. MacKenzie, San Diego, CA (US)

(73) Assignee: ACHATES POWER, INC., San Diego, CA (US)

(*) Notice: Subject to any disclaimer, the term of this patent is extended or adjusted under 35 U.S.C. 154(b) by 164 days.

(21) Appl. No.: 13/136,955

(22) Filed: Aug. 15, 2011

(65) Prior Publication Data

US 2012/0073526 A1  Mar. 29, 2012

Related U.S. Application Data

(60) Provisional application No. 61/401,598, filed on Aug. 16, 2010.

(51) Int. Cl.
*F01B 7/08* (2006.01)
*F01B 7/12* (2006.01)
(Continued)

(52) U.S. Cl.
CPC ... *F01B 7/08* (2013.01); *F01B 7/12* (2013.01); *F02B 23/0621* (2013.01); *F02B 23/0624* (2013.01); *F02B 23/0675* (2013.01); *F02B 25/08* (2013.01); *F02B 33/38* (2013.01);
(Continued)

(58) Field of Classification Search
CPC .......... F01B 7/08; F01B 7/12; F02B 23/0621; F02B 23/0624; F02B 23/0675; F02B 25/08; F02B 33/38; F02B 37/04; F02B 75/04; F02B 75/282; F02B 75/32
USPC ................ 123/41.44, 51 A, 51 B, 51 R, 53.6
See application file for complete search history.

(56) References Cited

U.S. PATENT DOCUMENTS 1,207,799 A * 12/1916 Scheller ....................... 123/51 B
1,523,453 A *  1/1925 Scott ........................... 123/51 B
(Continued)

FOREIGN PATENT DOCUMENTS

BE  388 676 A  5/1932
BE  388676 A   6/1932
(Continued)

OTHER PUBLICATIONS

Napier Nomad: An Engine of Outstanding Efficiency, Flight, Apr. 30, 1954, pp. 543-551.*

(Continued)

*Primary Examiner* — Lindsay Low
*Assistant Examiner* — Jacob Amick
(74) *Attorney, Agent, or Firm* — Terrance A. Meador (57) ABSTRACT

A piston construction for an opposed-piston engine accommodates contoured end surfaces of the piston crowns and articulation of the pistons with piston rods. The shape of each piston crown includes a bowl with an adjoining ridge that protrudes axially of the piston. A cooling construction for the piston includes an outer gallery running around the inner surface of the piston sidewall in the vicinity of the crown. The outer gallery girds and is in fluid communication with a central gallery that abuts the deepest part of the bowl. The outer gallery has an asymmetric profile that rises under the ridge and that slants upwardly under a peripheral portion of the bowl. A mechanism for coupling the piston to a piston rod includes a biaxial slipper bearing.

20 Claims, 6 Drawing Sheets

(51) Int. Cl.

| | |
|---|---|
| *F02B 23/06* | (2006.01) |
| *F02B 25/08* | (2006.01) |
| *F02B 33/38* | (2006.01) |
| *F02B 37/04* | (2006.01) |
| *F02B 75/04* | (2006.01) |
| *F02B 75/28* | (2006.01) |
| *F02B 75/32* | (2006.01) |
| *F02B 29/04* | (2006.01) |
| *F02M 25/07* | (2006.01) |

(52) U.S. Cl.
CPC ............... *F02B37/04* (2013.01); *F02B 75/04* (2013.01); *F02B 75/282* (2013.01); *F02B 75/32* (2013.01); *F02B 29/0406* (2013.01); *F02M 25/0711* (2013.01); *Y02T 10/125* (2013.01); *Y02T 10/144* (2013.01)

(56) References Cited

U.S. PATENT DOCUMENTS

| | | | | |
|---|---|---|---|---|
| 1,603,173 | A | 10/1926 | Watts | 123/196 R |
| 1,623,704 | A * | 4/1927 | Scott | 123/51 B |
| 2,369,500 | A | 2/1945 | Waeber | 123/176 |
| 2,853,983 | A * | 9/1958 | Sawle, Jr. | 123/51 BA |
| 3,131,785 | A | 5/1964 | Blank | 184/6 |
| 3,221,718 | A | 12/1965 | Isley | 123/32 |
| 3,983,793 | A | 10/1976 | Beardmore | 92/190 |
| 4,010,718 | A | 3/1977 | Stewart | 123/41.35 |
| 4,175,502 | A * | 11/1979 | Moebus | 123/41.35 |
| 4,204,487 | A | 5/1980 | Jones | 123/41.35 |
| 5,058,537 | A | 10/1991 | Paul et al. | 123/51 A |
| 5,533,472 | A | 7/1996 | Sands et al. | 123/41.35 |
| 5,915,345 | A | 6/1999 | Kling et al. | 123/41.35 |
| 6,481,389 | B2 | 11/2002 | Suzuki et al. | 123/41.35 |
| 7,156,056 | B2 | 1/2007 | Lemke et al. | 123/41.35 |
| 7,305,960 | B2 | 12/2007 | Zvonkovic | 123/193.6 |
| 7,360,511 | B2 | 4/2008 | Lemke et al. | 123/41.35 |
| 7,753,024 | B2 | 7/2010 | Hausler et al. | 123/196 R |
| 8,539,918 | B2 | 9/2013 | Lemke et al. | |
| 8,800,528 | B2 | 8/2014 | Fuqua et al. | |
| 2005/0274332 | A1 | 12/2005 | Lemke et al. | 123/41.35 |
| 2006/0157003 | A1 | 7/2006 | Lemke et al. | 123/41.38 |
| 2007/0039572 | A1 | 2/2007 | Lemke et al. | 123/51 BB |
| 2007/0245892 | A1 | 10/2007 | Lemke et al. | 92/169.1 |
| 2008/0163848 | A1 | 7/2008 | Lemke et al. | 123/197.3 |
| 2008/0314688 | A1 | 12/2008 | Lemke et al. | 184/6.8 |
| 2010/0012055 | A1 | 1/2010 | Lemke et al. | 123/41.35 |
| 2010/0107868 | A1 | 5/2010 | Scharp et al. | 92/159 |
| 2010/0212613 | A1 | 8/2010 | Lemke et al. | |
| 2010/0224162 | A1 | 9/2010 | Hofbauer | 123/196 R |
| 2011/0041684 | A1 | 2/2011 | Kortas et al. | 92/255 |
| 2011/0271932 | A1 | 11/2011 | Fuqua et al. | |

FOREIGN PATENT DOCUMENTS

| | | | |
|---|---|---|---|
| DE | 195 47 186 | 7/1988 | ............... F02C 7/06 |
| DE | 424 3571 | 12/1992 | ............... F02F 3/16 |
| DE | 19910092 A1 | 9/2000 | |
| DE | 199 62 325 | 7/2001 | ............... F02F 3/16 |
| DE | 10 2006 055 251 A1 | 5/2008 | ............... F02F 3/10 |
| DE | 10 2008 055911 A1 | 5/2010 | ............... F02F 3/22 |
| EP | 0747591 A1 | 12/1996 | ............... F02F 3/22 |
| SU | 1 216 394 A1 | 3/1986 | ............ F02B 41/04 |
| SU | 1216394 A * | 3/1986 | |
| WO | 2005/103456 | 11/2005 | ............... F01M 1/08 |
| WO | 2005/124124 A1 | 12/2005 | ............... F02B 75/28 |
| WO | WO-2012/023970 A2 | 2/2012 | |

OTHER PUBLICATIONS

H. Sammons, E. Chatterton; *Napier Nomad Aircraft Diesel Engine*, SAE Transactions, vol. 63, 1955, pp. 107-131.

J.F. Butler, E.P. Crowdy; *The Doxford Seahorse Engine*, paper presented at a joint meeting of the Institute and N.E.C.I.E.S. on Nov. 8-9, 1971 pp. 73-115.

W.E. ten Napel, R. Bosma, M. Akker, *Lubrication of the small end bearings in supercharged two-stroke diesel engines*, Tribology of Reciprocating Engines: Proceedings 9$^{th}$ Leeds-Lyons Symposium on Tribology, 1982, pp. 37-46.

Chinese Abstract of CN 1077214C.

English Translation of First Office Action issued by the State Intellectual Property Office of PRC in PRC application 200580023840.9; Issued Jul. 25, 2008.

International Search Report and Written Opinion for PCT/US2011/001429, mailed Mar. 12, 2012.

Office Action for CN application 201180043771.3, mailed Dec. 3, 2014.

* cited by examiner

PISTON CONSTRUCTIONS FOR OPPOSED-PISTON ENGINES

This application claims priority to U.S. provisional application for patent U.S. 61/401,598, filed Aug. 16, 2010.

BACKGROUND

The field is internal combustion engines, particularly two-stroke opposed-piston engines. In one aspect, the field relates to cooling opposed pistons with contoured end surfaces. In another aspect, the field relates to articulation of opposed pistons with crankshaft linkages.

Figure 1:
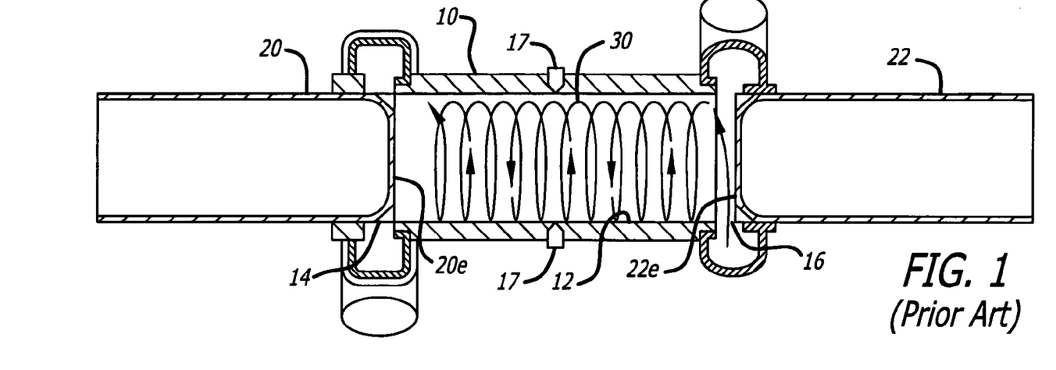
FIG. 1 is a side sectional partially schematic drawing of a cylinder of a prior art opposed-piston engine with opposed pistons near respective bottom dead center locations, and is appropriately labeled "Prior Art".

As seen in FIG. 1, an internal combustion engine is illustrated by way of an opposed-piston engine that includes at least one cylinder 10 with a bore 12 and longitudinally-displaced exhaust and intake ports 14 and 16 machined or formed therein. Fuel injector nozzles 17 are located in or adjacent injector ports that open through the side of the cylinder, at or near the longitudinal center of the cylinder. Two pistons 20, 22 are disposed in the bore 12 with their end surfaces 20e, 22e in opposition to each other. For convenience, the piston 20 is referred as the "exhaust" piston because of its proximity to the exhaust port 14; and, the end of the cylinder wherein the exhaust port is formed is referred to as the "exhaust end". Similarly, the piston 22 is referred as the "intake" piston because of its proximity to the intake port 16, and the corresponding end of the cylinder is the "intake end".

Operation of an opposed-piston engine with one or more cylinders such as the cylinder 10 is well understood. In this regard, and with reference to FIG. 2, in response to combustion occurring between the end surfaces 20e, 22e the opposed pistons move away from respective top dead center (TDC) positions where they are at their closest positions relative to one another in the cylinder. While moving from TDC, the pistons keep their associated ports closed until they approach respective bottom dead center (BDC) positions in which they are furthest apart from each other. The pistons may move in phase so that the exhaust and intake ports 14, 16 open and close in unison. Alternatively, one piston may lead the other in phase, in which case the intake and exhaust ports have different opening and closing times.

In many opposed-piston constructions, a phase offset is introduced into the piston movements. As shown in FIG. 1, for example, the exhaust piston leads the intake piston and the phase offset causes the pistons to move around their BDC positions in a sequence in which the exhaust port 14 opens as the exhaust piston 20 moves through BDC while the intake port 16 is still closed so that combustion gasses start to flow out of the exhaust port 14. As the pistons continue moving away from each other, the intake port 16 opens while the exhaust port 14 is still open and a charge of pressurized air ("charge air") is forced into the cylinder 10, driving exhaust gasses out of the exhaust port 14. The displacement of exhaust gas from the cylinder through the exhaust port while admitting charge air through the intake port is referred to as "scavenging". Because the charge air entering the cylinder flows in the same direction as the outflow of exhaust gas (toward the exhaust port), the scavenging process is referred to as "uniflow scavenging".

Figure 2:
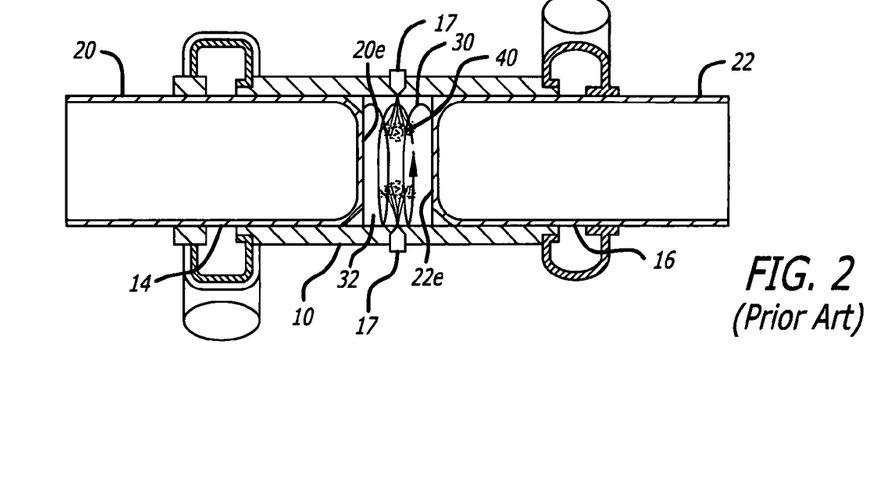
FIG. 2 is a side sectional partially schematic drawing of the cylinder of FIG. 1 with the opposed pistons near respective top dead center locations where end surfaces of the pistons define a combustion chamber, and is appropriately labeled "Prior Art".

As the pistons move through their BDC locations and reverse direction, the exhaust port 14 is closed by the exhaust piston 20 and scavenging ceases. The intake port 16 remains open while the intake piston 22 continues to move away from BDC. As the pistons continue moving toward TDC (FIG. 2), the intake port 16 is closed and the charge air in the cylinder is compressed between the end surfaces 20e and 22e. Typically, the charge air is swirled as it passes through the intake port 16 to promote scavenging while the ports are open and, after the ports close, to mix the air with the injected fuel. Typically, the fuel is diesel which is injected into the cylinder by high pressure injectors. With reference to FIG. 1 as an example, the swirling air (or simply, "swirl") 30 has a generally helical motion that forms a vortex in the bore which circulates around the longitudinal axis of the cylinder. As best seen in FIG. 2, as the pistons advance toward their respective TDC locations in the cylinder bore, fuel 40 is injected through the nozzles 17 directly into the swirling charge air 30 in the bore 12, between the end surfaces 20e, 22e of the pistons. The swirling mixture of charge air and fuel is compressed in a combustion chamber 32 defined between the end surfaces 20e and 22e when the pistons 20 and 22 are near their respective TDC locations. When the mixture reaches an ignition temperature, the fuel ignites in the combustion chamber, driving the pistons apart toward their respective BDC locations In some aspects of two-stroke, opposed-piston engine construction it is desirable to utilize pistons with crowns having highly contoured end surfaces that interact with swirl and with squish flow from the periphery of the combustion chamber to produce complex, turbulent charge air motion that encourages uniform mixing of air and fuel. However, combustion imposes a heavy thermal load on the piston crowns. The highly contoured end surfaces create non-uniform thermal profiles that are not suitably cooled by conventional forced cooling configurations, leading to asymmetrical thermal stress, wear, and piston crown fracture. It is therefore desirable to provide piston constructions with the capability of cooling the contoured crowns of such pistons.

In other aspects of two-stroke, opposed-piston engine construction, the nature of the operating cycle results in the uninterrupted application of compressive loads on bearings in the piston-to-crankshaft connecting linkages. These non-reversing loads prevent the separation of bearing surfaces, which blocks the flow of lubricant therebetween and limits the durability of such bearings. As a result, during opposed-piston engine operation a continuous compressive load is exerted on wristpin bearings throughout the operating cycle. It is therefore desirable to provide piston constructions with the capability of articulating the piston with a connecting rod by way of a bearing construction that separates bearing surfaces for provision of lubrication during the operational cycle of an opposed-piston engine.

In yet other aspects of two-stroke, opposed-piston engine construction, the cooling and bearing structures are both housed in a limited space defined by the piston skirt. It is therefore desirable to provide a piston construction that positions those structures with a minimum of occupied space.

SUMMARY

An object is to provide a piston construction having a cooling structure that affords more effective cooling of a contoured piston end surface and increases the durability of the piston crown in an opposed-piston engine.

Another object is to provide piston bearing constructions that alleviate the lubricant-blocking effects of non-reversing loads and increase the durability of the bearings in an opposed-piston engine. In one embodiment, a bearing construction for coupling a tumble-inducing piston to a piston rod of an opposed-piston engine includes a biaxial bearing that causes separation of bearing surfaces during engine operation to allow provision of lubricant between the surfaces, thereby increasing the durability of the coupling between the piston and the piston rod.

Still another object is to provide a piston construction with cooling and coupling structures that occupy a minimal space within the piston skirt, thereby providing a simpler, less massive piston.

DETAILED DESCRIPTION OF THE PREFERRED EMBODIMENTS

The following description includes a ported, uniflow scavenging engine having at least one cylinder in which a pair of pistons is disposed with their end surfaces in opposition. This explanatory context is intended only to provide a basis for understanding various piston construction embodiments by way of illustrative examples in an operational opposed-piston environment but is not intended to limit the application of the illustrated constructions to any particular opposed-piston architecture.

Figure 3:
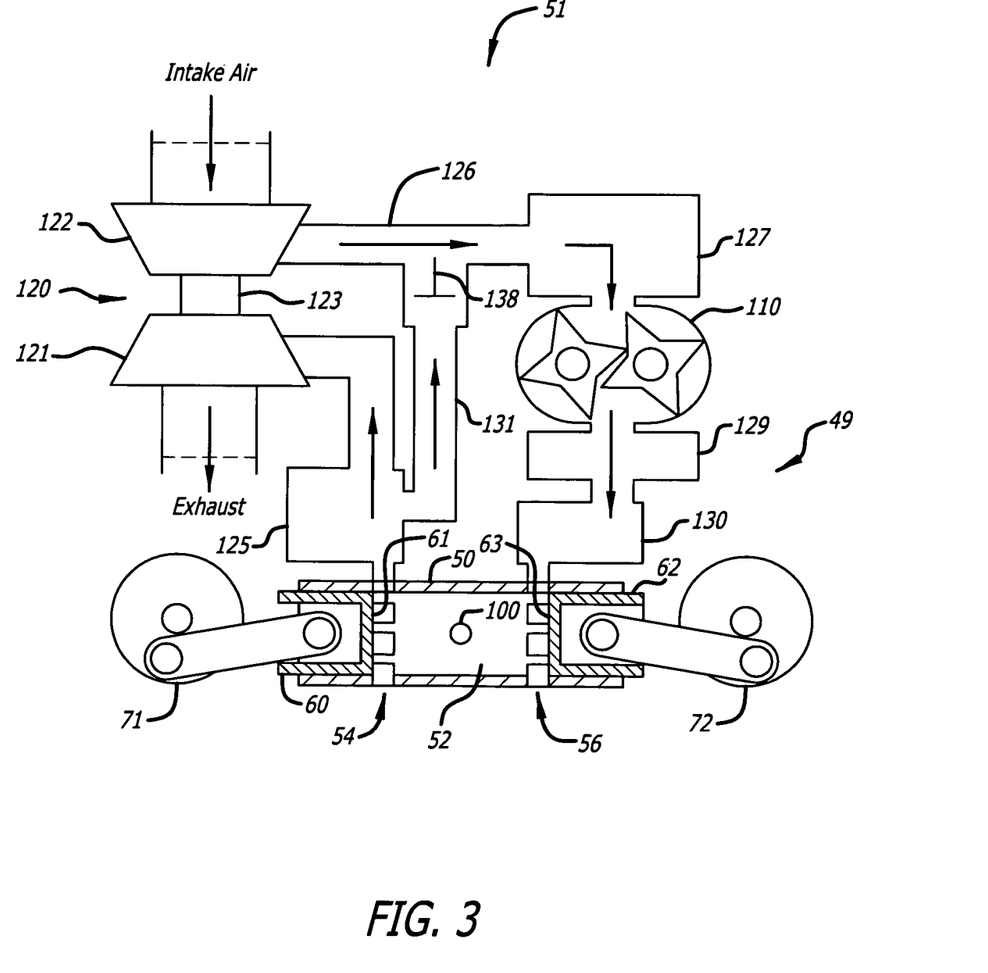
FIG. 3 is a conceptual schematic diagram of an internal combustion engine in which aspects of the invention are illustrated.

In FIG. 3, an internal combustion engine 49 is embodied by an opposed-piston engine having at least one ported cylinder 50. For example, the engine may have one ported cylinder, two ported cylinders, three ported cylinders, or four or more ported cylinders. For purposes of illustration, in the examples to be illustrated and described the engine is an engine of the opposed-piston type that is presumed to have a plurality of ported cylinders. In this regard, each cylinder 50 has a bore 52 and exhaust and intake ports 54 and 56 formed in respective ends thereof. The exhaust and intake ports 54 and 56 each include one or more circumferential arrays of openings in which adjacent openings are separated by a solid bridge. (In some descriptions, each opening is referred to as a "port"; however, the construction of a circumferential array of such "ports" is no different than the port constructions shown in FIG. 3.) Exhaust and intake pistons 60 and 62 are slidably disposed in the bore 52 with their end surfaces 61 and 63 opposing one another. The exhaust pistons 60 are coupled to a crankshaft 71, and the intake pistons are coupled to the crankshaft 72. When the pistons 60 and 62 of a cylinder 50 are at or near their TDC positions, a combustion chamber is defined in the bore 52 between the end surfaces 61 and 63 of the pistons. Fuel is injected directly into the combustion chamber through at least one fuel injector nozzle 100 positioned in an opening through the sidewall of the cylinder 50.

With further reference to FIG. 3, the engine 49 includes an air management system 51 that includes a supercharger 110 and a turbo-charger 120 with a turbine 121 and a compressor 122 rotating on a common shaft 123. The turbine 121 is coupled to the exhaust subsystem and the compressor 122 is coupled to the charge air subsystem. The turbine 121 is rotated by exhaust gas passing through it. This rotates the compressor 122, causing it to generate charge air by compressing intake air. The charge air output by the compressor 122 flows through a conduit 126 to a charge air cooler 127, whence it is pumped by the supercharger 110 to the intake ports. Air compressed by the supercharger 110 is output through a charge air cooler 129 to an intake manifold 130. The intake ports 56 receive charge air pumped by the supercharger 110, through the intake manifold 130.

Piston Construction:

An internal combustion engine 49 of the opposed-piston type includes at least one cylinder 50 with longitudinally-separated exhaust and intake ports 54 and 56 as per FIG. 3. The pistons 60 and 62 are disposed in opposition in the cylinder bore 52. As the pistons reciprocate in the bore during engine operation, contoured piston end surfaces, each including a bowl adjoined with a protruding side, cooperate to define a combustion chamber with a semi-ellipsoidal space that tapers toward each end so as to produce complex, turbulent charge air motion including at least swirl and tumble components. See, in this regard, commonly-owned U.S. patent application Ser. No. 13/066,589, filed Apr. 18, 2011, which was published as US 2011/0271932 A1 on Nov. 10, 2011 and issued as U.S. Pat. No. 8,800,528 B2 on Aug. 12, 2014. The complex air motion in the combustion chamber encourages the mixing of charge air with fuel for more complete and more uniform ignition than would otherwise occur.

Figure 4:
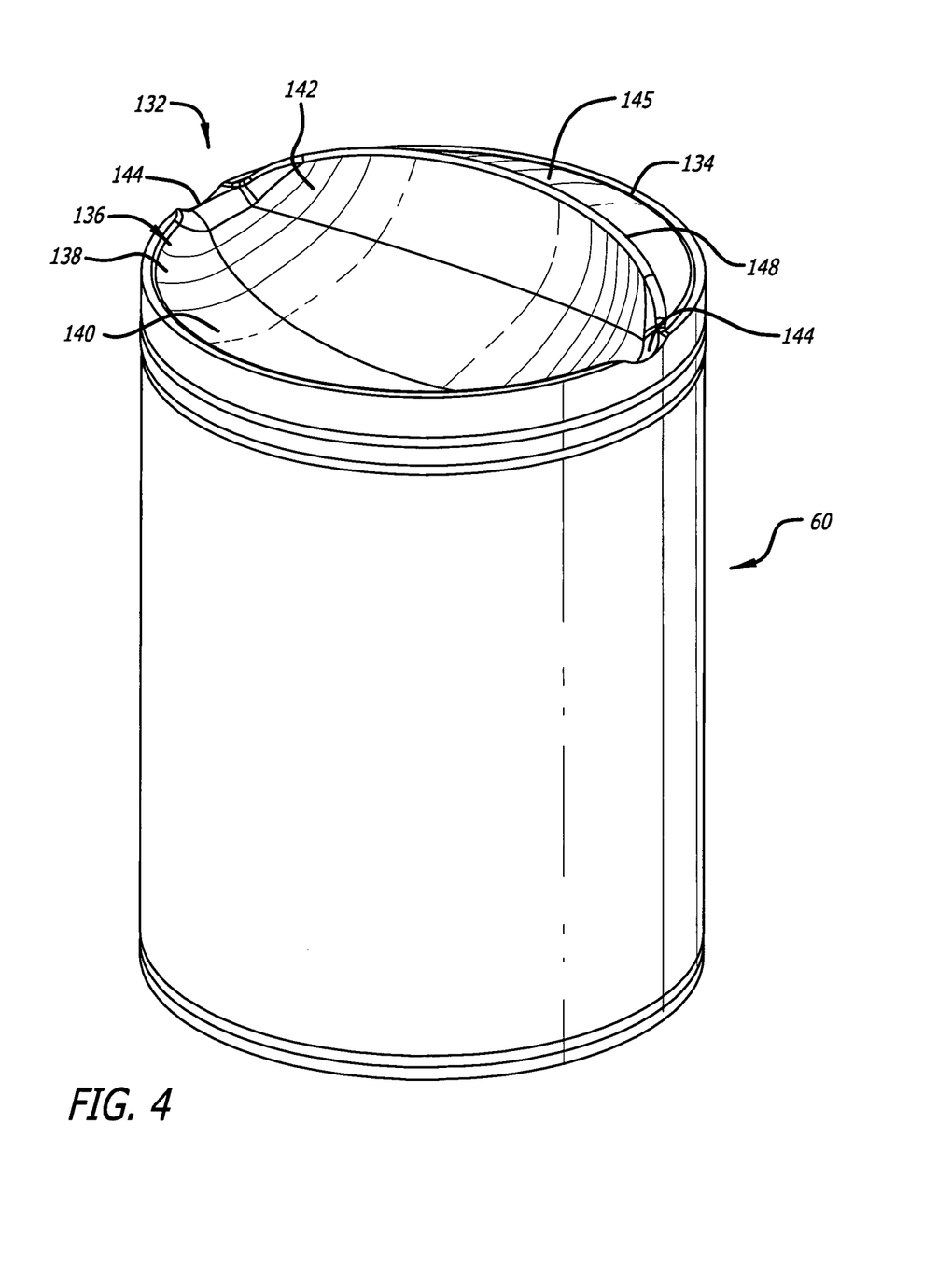
FIG. 4 is an elevational perspective view of a piston of a pair of pistons in which identical end surfaces of the pair of pistons are formed to define a combustion chamber construction.

One example of a piston with a contoured end surface is illustrated in FIG. 4. The structures of the piston end surfaces of two opposed pistons that define a combustion chamber are essentially identical to each other; accordingly, the piston 60 shown in FIG. 4 represents both pistons 60 and 62. The piston 60 has an end surface 132. A flat circumferential area 134 centered on the longitudinal axis of the piston 60 defines a periphery of the end surface 132. A bowl 136 is formed within the periphery. The bowl 136 has a concave surface 138 with a first portion 140 curving inwardly from a plane containing the flat circumferential area 134, toward the interior of the piston 60, and a second portion 142 curving outwardly from the interior of the piston through the plane. The end surface 132 further includes a convex surface 145 within the periphery that curves outwardly from the plane. The convex surface 145 meets the second portion 142 of the concave surface 138 to form a ridge 148 that protrudes outwardly from the end surface 132. At least one notch 144 extends through the periphery into the bowl 136; preferably two aligned notches 144 are provided.

Figure 5:
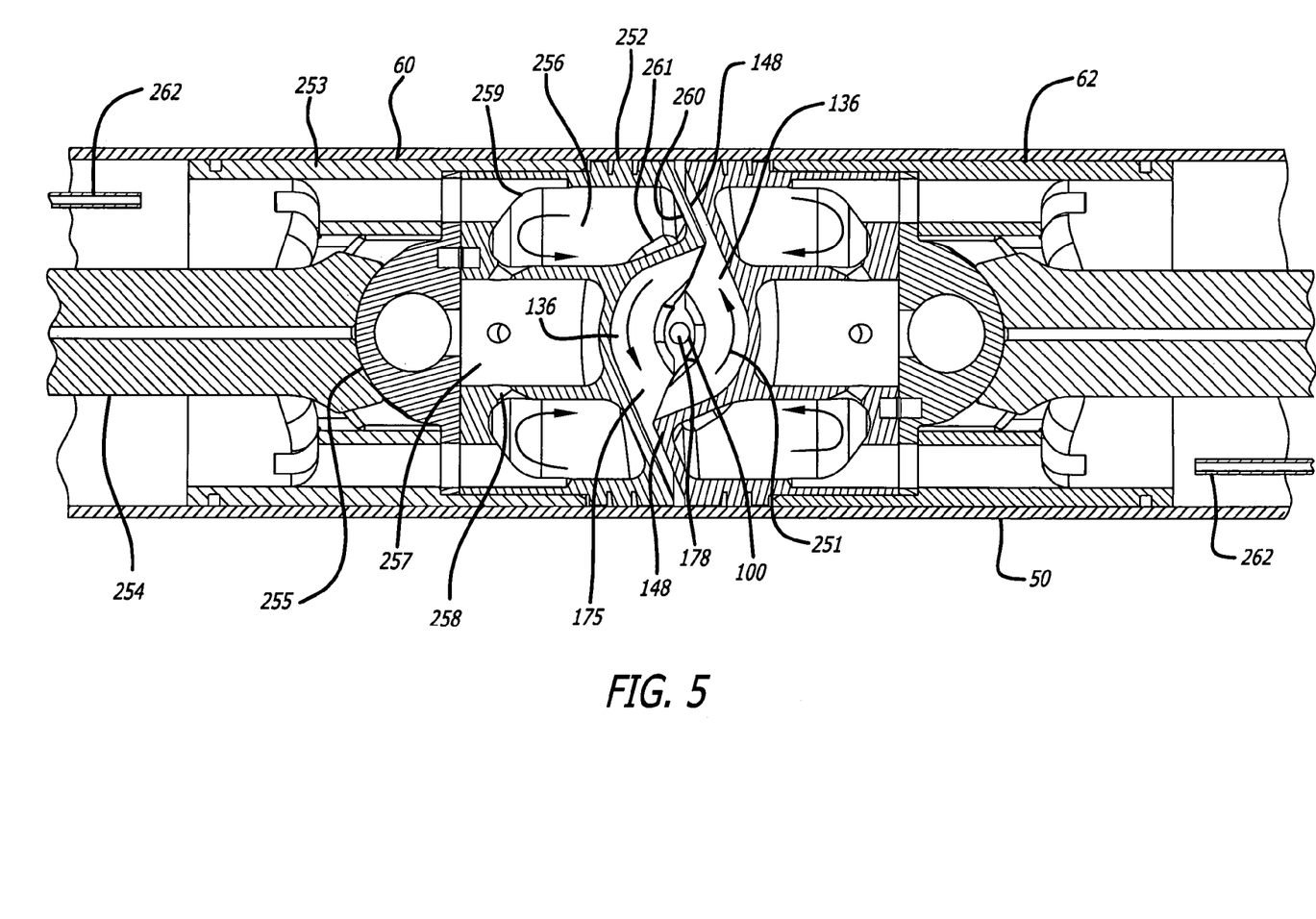
FIG. 5 is a side sectional view of two opposing pistons near TDC positions in a cylinder showing construction features of the pistons and a combustion chamber defined between the end surfaces of the pistons.

With reference to FIGS. 4 and 5, as the pistons 60 and 62 approach TDC the charge air in the cylinder is increasingly compressed between the end surfaces 61 and 63. As the pistons 60 and 62 move through their respective TDC locations, the opposing concave and convex surfaces define a combustion chamber 175 having a shape that tapers to two diametrically aligned ends. For example, the combustion chamber has a semi-ellipsoidal shape. Preferably, each of the opposed injector ports 100 is located at or near a respective tapered end of the combustion chamber 175. Opposing pairs of notches 144 in the end surfaces 132 define injection ports that open into the combustion chamber 175 at opposing pole positions of the semi-ellipsoidal shape. Preferably the injector ports are aligned with a major axis 178 of the combustion chamber 175.

As the pistons 60 and 61 move toward TDC, swirling charge air is increasingly compressed between the end surfaces 132. As the pistons approach TDC, compressed air flows from the peripheries 134 of the end surfaces through squish channels defined between the concave-convex surface pairs 140, 145. These squish airflows flow into the combustion chamber. These squish flows are oppositely-directed, parallel, and skewed with respect to the major axis 178. This spatial relationship causes generation of a tumbling motion 251 when the squish flows encounter the outwardly-directed end surface portions 142 of the end surfaces. When fuel is injected into the turbulent charge air, combustion occurs.

Figures 6, 7:
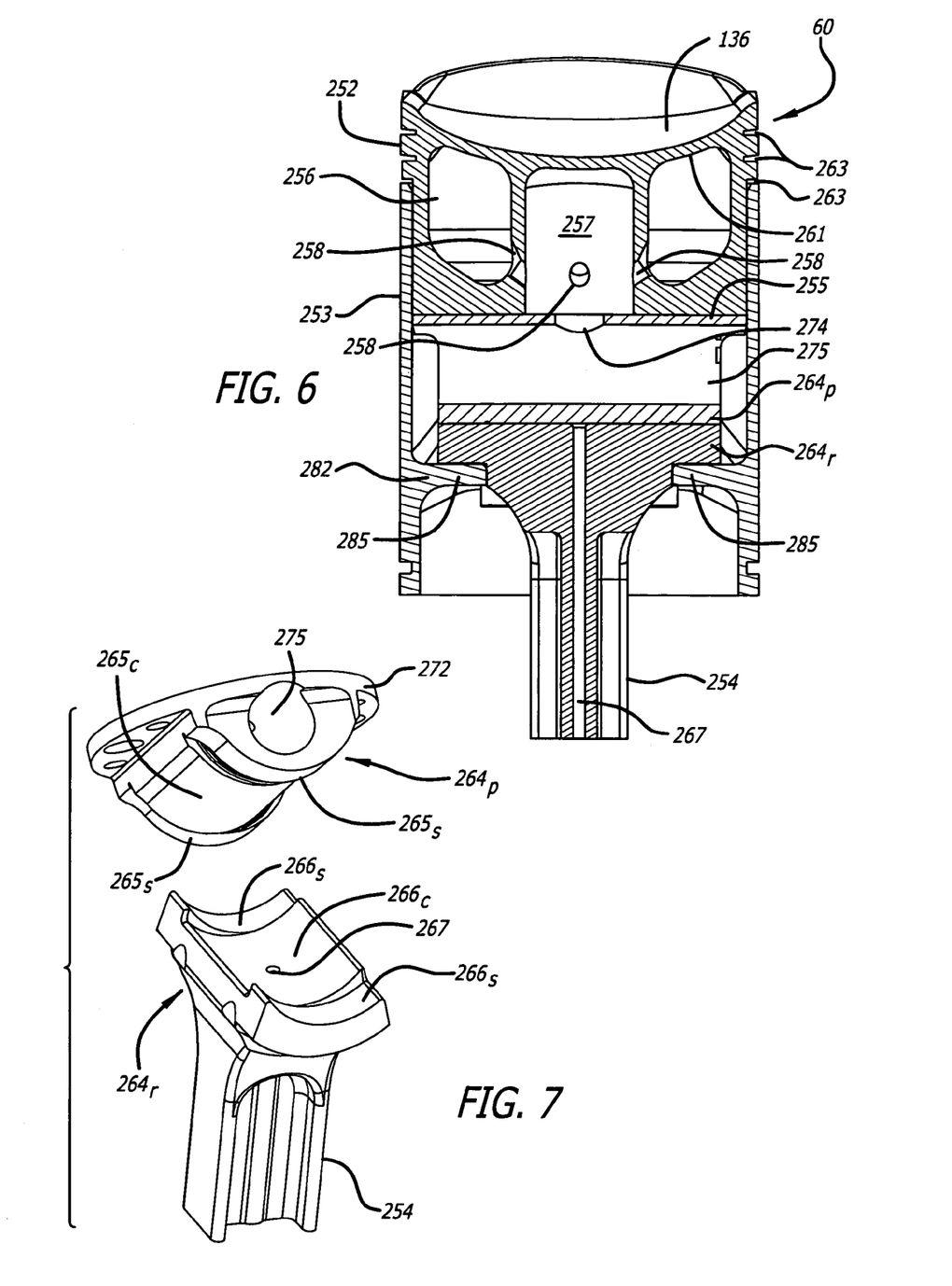
FIG. 6 is a side sectional view of one of the pistons of FIG. 5 rotated 90° from the view of FIG. 5.
FIG. 7 is an enlarged perspective view of the dual eccentric structure of a mechanism for coupling the piston to a piston rod.

Piston Cooling:

Piston cooling is identical for all pistons in the engine, and so will be described with reference only to the piston 60. As best seen in FIGS. 5 and 6, the piston 60 includes a crown 252 assembled or joined to a main body and skirt 253. A piston rod 254 is coupled to the piston 60 by a coupling mechanism 255. The contoured end surface 132 of the piston 60 is formed on the face of the crown 252. The crown 252 is cooled by flow of a liquid coolant through one or more internal galleries. For example, the crown 252 has an annular gallery 256 that follows the periphery of the crown and girds a central gallery 257. The annular gallery 256 communicates with the central gallery 257 through holes 258. The annular gallery 256 has an asymmetric profile that rises as at 260 under the ridge 148 and that slants upwardly as at 261 under the concave portion 138 of the bowl 136. The central gallery 257 abuts the deepest part of the bowl 136. Liquid coolant, preferably lubricating oil, is provided in a high pressure stream from a jet 262. The stream enters through an opening 259 in the floor of the annular gallery 256. The liquid coolant strikes the interior surface of the annular gallery at its highest point 260, thereby cooling that portion of the crown by impingement, and flows from there throughout the annular gallery 256. The liquid coolant delivered by the high velocity stream collects or accumulates in the central gallery 257 where it continuously irrigates the interior portion of the crown along the inside of the ridge 148. Liquid coolant flowing throughout the annular gallery 256 washes and cools an annular portion of the crown around and under the bowl 136, and washes and cools an annular portion of the crown sidewall that includes ring grooves 263. Reciprocation of the piston agitates the liquid coolant, which causes it to circulate in the annular gallery 256. In response to the agitation and piston motion, liquid coolant also flows from the annular gallery 256 into the central gallery 257 through the holes 258. Piston reciprocation also agitates the liquid coolant collected or accumulated in the central gallery 257 so as to cool the crown 252 beneath the central portion of the bowl 136. The liquid coolant flows from the bottom of central gallery 257 through a hole in the coupling mechanism 255, and out the sides of the coupling mechanism 255 into the interior of the skirt 253. From there, the liquid coolant flows out the open end of the skirt 253 whence it is collected in a sump.

Coupling Mechanism Construction:

As seen in FIGS. 6 and 7, there is no wristpin in the construction of the coupling mechanism 255. Instead, the bearing linking the piston 60 with the piston rod 254 includes two parts with complementarily-curved bearing surfaces. One bearing part 264p is joined to the back of the crown 252; the other bearing part 264r is formed on the end of the piston rod 254. Each of the bearing surfaces includes eccentric sections; together, the bearing pieces 264p and 264r constitute a biaxial, or eccentric, slipper bearing. Such a bearing construction is known: see, for example, "Napier Nomad", FLIGHT, 30 Apr. 1954, pp. 543-552. In the slipper bearing, each bearing surface is constituted of three lengthwise sections: two outer sections and a center section. On the bearing piece 264p, the three sections are outer sections 265s and center section 265c. On the bearing piece 264r, the three sections are outer sections 266s and center section 266c. In each bearing surface, the two outer sections are coaxial with each other and displaced from a centerline of the bearing. The center section of each bearing surface is displaced in the opposite direction from the bearing centerline. Since the bearing therefore has a first axis shared by the side sections and a second axis for the center section, the bearing is said to be "biaxial". The two displacements may or may not be equal, depending on the oscillating motion of the piston rod 254. Thus the two axes are eccentric in relation to each other. In an exemplary application for bearings of 50 to 100 mm in diameter this eccentricity is on the order of 0.1 to 1 mm. The eccentricity of the bearing provides a mechanical lifting of one bearing surface from off of the journal surface on alternate sides as the piston rod 254 oscillates from side to side. This provides the separation in the bearing surfaces of the coupling mechanism 255 so that pressurized oil, fed from a drilling 267 in the center of the piston rod 254, can enter in the void between the surfaces. The bearing surface on the bearing piece 264r is located furthest away from the piston crown to allow for lower lubricant operating temperatures to keep the oil viscosity higher and provide for a greater minimum oil film thickness (MOFT) when the squeeze film develops.

Figure 8:
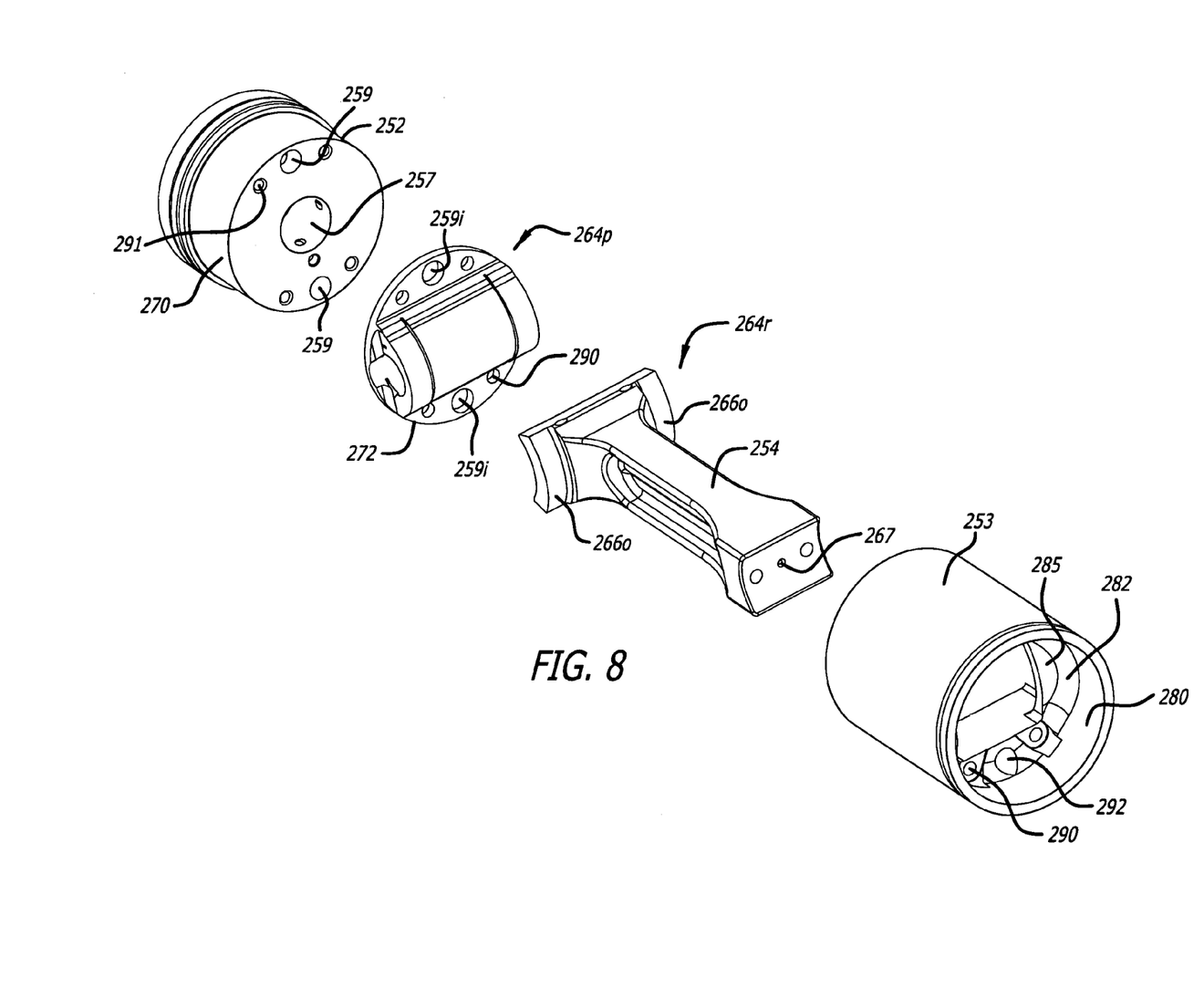
FIG. 8 is an exploded view, in perspective, showing assembly of the piston of FIG. 6.

The pistons are assembled as illustrated in FIGS. 6-8. Referring to the piston 60, the annular and central galleries are formed in an annular portion 270 that can be joined to the crown 252 by threading, press fitting, soldering, or brazing, are any equivalent process. Preferably, there are two liquid coolant stream openings 259 through which streams of liquid coolant enter the annular chamber. The bearing part 264p includes a circular plate 272 that seats against the end face of the annular portion 270 with openings 2591 in alignment with corresponding openings 259. When seated, the circular plate 272 closes the central gallery 257. The plate has a hole 274 (best seen in FIG. 6) in alignment with the central gallery 257. The hole 274 provides liquid communication between the central gallery 257 and a gallery 275 running behind the bearing sections 265s and 265c and open at each end. A clamping structure is formed on the inner surface of the piston skirt's sidewall, near the open end 280 of the skirt. The clamping structure includes a flange 282 with openings 2592 and spaced-apart slipper supports 285 that are shaped to retain the side section outer surfaces 266o for slidable movement that enables the piston rod 254 to swing thereon. The parts 253, 254, 272, and 252 are assembled as illustrated in FIG. 8, with the circular plate 272 abutting the end face of the annular portion and the bearing piece 264p held between the bearing piece 264p and the slipper supports 285. Threaded screws extend through holes 290 and are threadably seated in holes in the end face of the annular piece so as to hold the parts 253, 254, 272, and 252 together. The piston parts 253, 254, 272, and 252 and associated cylinder can be manufactured by casting and/or machining metal materials including, without limitation, steel and/or aluminum.

Although the novel constructions and methods have been described with reference to a number of embodiments, it should be understood that various modifications can be made to them without departing from the spirit of the underlying principles. Accordingly, the patent protection to which the applicants are entitled is limited only by the following claims.

We claim:

1. An internal combustion engine including at least one cylinder with longitudinally-separated exhaust and intake ports and a pair of pistons disposed in opposition to one another in a bore of the cylinder, each piston including a cooling gallery and a crown with an end surface identical to the end surface of the opposing piston, in which the end surface of each piston has a periphery, an elongated bowl adjoined by a curved ridge, and two aligned notches that extend through the periphery into the bowl, wherein the end surface cooperates with the end surface of the opposing piston to define a combustion chamber with a generally ellipsoidal shape, and each cooling gallery has an asymmetric profile that rises under the ridge and that slants upwardly under a concave portion of the bowl, and a port is positioned in each cooling gallery to receive a jet of liquid coolant.

2. The internal combustion engine of claim 1, wherein a biaxial slipper bearing is mounted on the back of each crown for linking the piston with a piston rod.

3. An opposed-piston engine including at least one cylinder with longitudinally-separated exhaust and intake ports and a pair of pistons disposed in opposition to one another in a bore of the cylinder, each piston including a crown with an end surface identical to the end surface of the opposing piston, and each end surface having a periphery, an elongated bowl adjoined by a curved protruding ridge, and two aligned notches that extend through the periphery into the bowl, wherein each end surface cooperates with the end surface of the other piston to define a combustion chamber with a generally ellipsoidal shape, and in which each piston includes a skirt containing at least one cooling gallery having an asymmetrical profile that rises under the ridge and that slants upwardly under a concave portion of the bowl, and a port is positioned in the at least one cooling gallery to receive a jet of liquid coolant.

4. The opposed-piston engine of claim 3, in which the at least one gallery is an annular gallery that follows the periphery of the crown.

5. The opposed-piston engine of claim 4, in which each piston further includes a central cooling gallery girded by an annular gallery and at least one hole that provides liquid communication between the annular and central galleries.

6. The opposed-piston engine of claim 5, in which the central gallery is positioned against the deepest part of the bowl.

7. The opposed-piston engine of claim 6, in which each piston further includes a plate closing the central gallery and a hole in the plate for conducting liquid coolant out of the central gallery.

8. The opposed-piston engine of claim 6, in which each piston further includes a coupling mechanism closing the central gallery, the coupling mechanism including a gallery that opens to the interior of the piston, and a hole in the coupling mechanism for conducting liquid coolant out of the central gallery into the coupling mechanism gallery.

9. The opposed-piston engine of claim 8, in which the coupling mechanism includes a biaxial slipper bearing coupling the piston to a piston rod.

10. A piston, comprising:
a crown with an end surface;
the end surface including an elongated bowl adjoined by a curved protruding ridge that cooperates with an end surface of another piston disposed in opposition to form a combustion chamber having a generally ellipsoidal shape;
the end surface further including a periphery with two aligned notches that extend through the periphery into the bowl;
a first cooling gallery with an asymmetric profile that rises under the ridge and slants upwardly under a concave portion of the bowl; and
a port positioned in the first cooling gallery to receive a jet of liquid coolant.

11. The piston of claim 10, further comprising a second cooling gallery positioned against the deepest part of the bowl and at least one hole that provides liquid communication between the first and second galleries.

12. The piston of claim 11, further comprising a plate closing the second gallery and a hole in the plate for conducting liquid coolant out of the second gallery into the interior of the piston.

13. The piston of claim 10, further comprising a biaxial slipper mechanism abutting the first cooling gallery and coupling the piston to a piston rod.

14. The piston of claim 13, further comprising a second cooling gallery positioned against the deepest part of the bowl, a first hole that provides liquid communication between the first and second galleries, a gallery in the biaxial slipper mechanism that opens to the interior of the piston, and a second hole that provides liquid communication between the second gallery and the gallery in the biaxial slipper mechanism.

15. The piston of claim 14, in which the first gallery is an annular gallery following the periphery of the piston crown and girding the second gallery.

16. A method of cooling opposed pistons of an opposed piston engine, each piston including a skirt, a crown attached to the skirt, the crown having an end surface with a periphery, an elongated bowl adjoined by a curved protruding ridge" and two aligned notches that extend through the periphery into the bowl, wherein the end surface cooperates with the end surface of an opposing piston to define a combustion chamber with a generally ellipsoidal shape, the method comprising, for each piston:
providing a stream of liquid coolant into an asymmetrical annular gallery that abuts the end surface of the piston such that the stream strikes an interior surface at the highest point of the annular gallery, under the ridge;
collecting liquid coolant of the stream in the annular gallery; and,
agitating the liquid coolant in the annular gallery in response to reciprocation of the piston.

17. The method of claim 16, further comprising, for each piston, causing liquid coolant to flow from the annular gallery to a central gallery positioned beneath the central portion of the bowl.

18. The method of claim 17, further comprising, for each piston, causing liquid coolant to flow from the central gallery into the interior of the skirt, and, causing liquid coolant to flow out of the interior of the piston.

19. A piston for an opposed-piston engine, comprising:
a crown with an end surface;
the end surface including an elongated bowl adjoined by a curved protruding ridge that cooperates with an identical end surface of another piston when the pistons are disposed in opposition to define a combustion chamber with a generally ellipsoidal shape;

the end surface further including a periphery with two aligned notches that extend through the periphery into the bowl;

a skirt fixed to the crown; and, a biaxial slipper mechanism mounted in the skirt and coupling the piston to a piston rod.

20. The piston of claim 19, further including a cooling gallery in the piston, positioned between the crown and the biaxial slipper mechanism, the cooling gallery having an asymmetric profile that rises under the ridge and slants upwardly under a concave portion of the bowl.

\* \* \* \* \*

UNITED STATES PATENT AND TRADEMARK OFFICE
CERTIFICATE OF CORRECTION

PATENT NO. : 9,163,505 B2  Page 1 of 1
APPLICATION NO. : 13/136955
DATED : October 20, 2015
INVENTOR(S) : Eric P. Dion et al.

It is certified that error appears in the above-identified patent and that said Letters Patent is hereby corrected as shown below:

In the Claims

Column 8, claim 16, line 39, change "ridge"" to read -- ridge, --

Signed and Sealed this
Twenty-second Day of March, 2016

Michelle K. Lee
*Director of the United States Patent and Trademark Office*